UNITED STATES PATENT OFFICE.

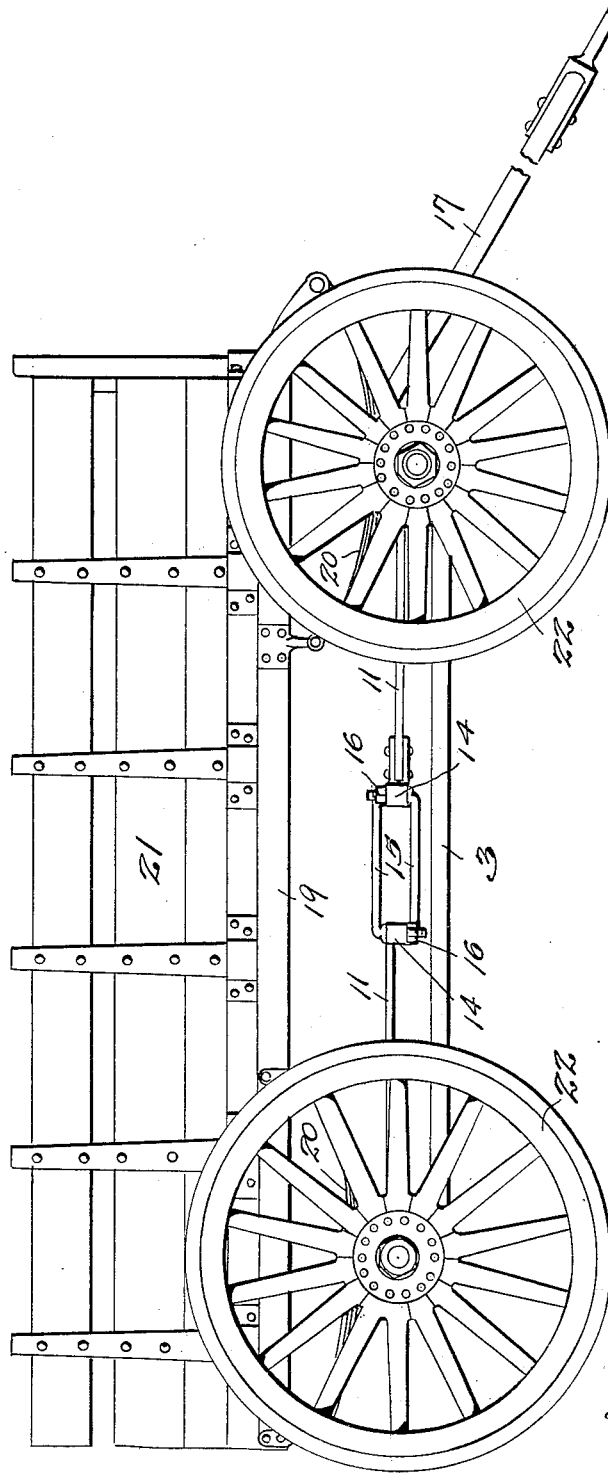
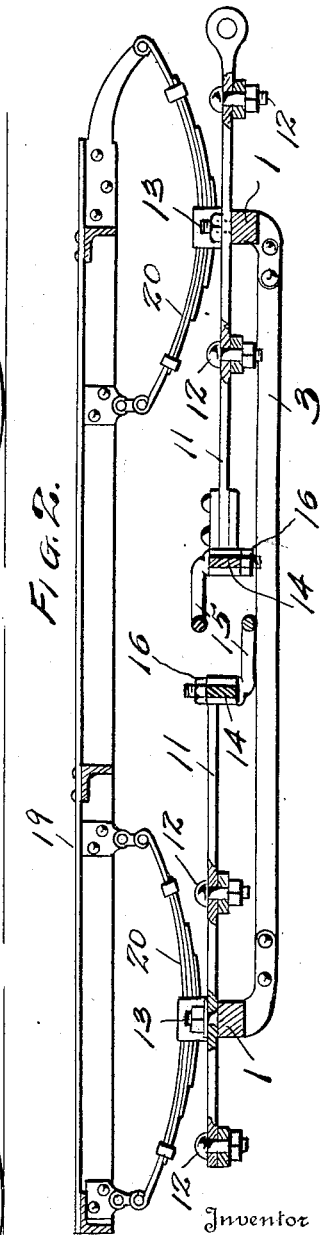

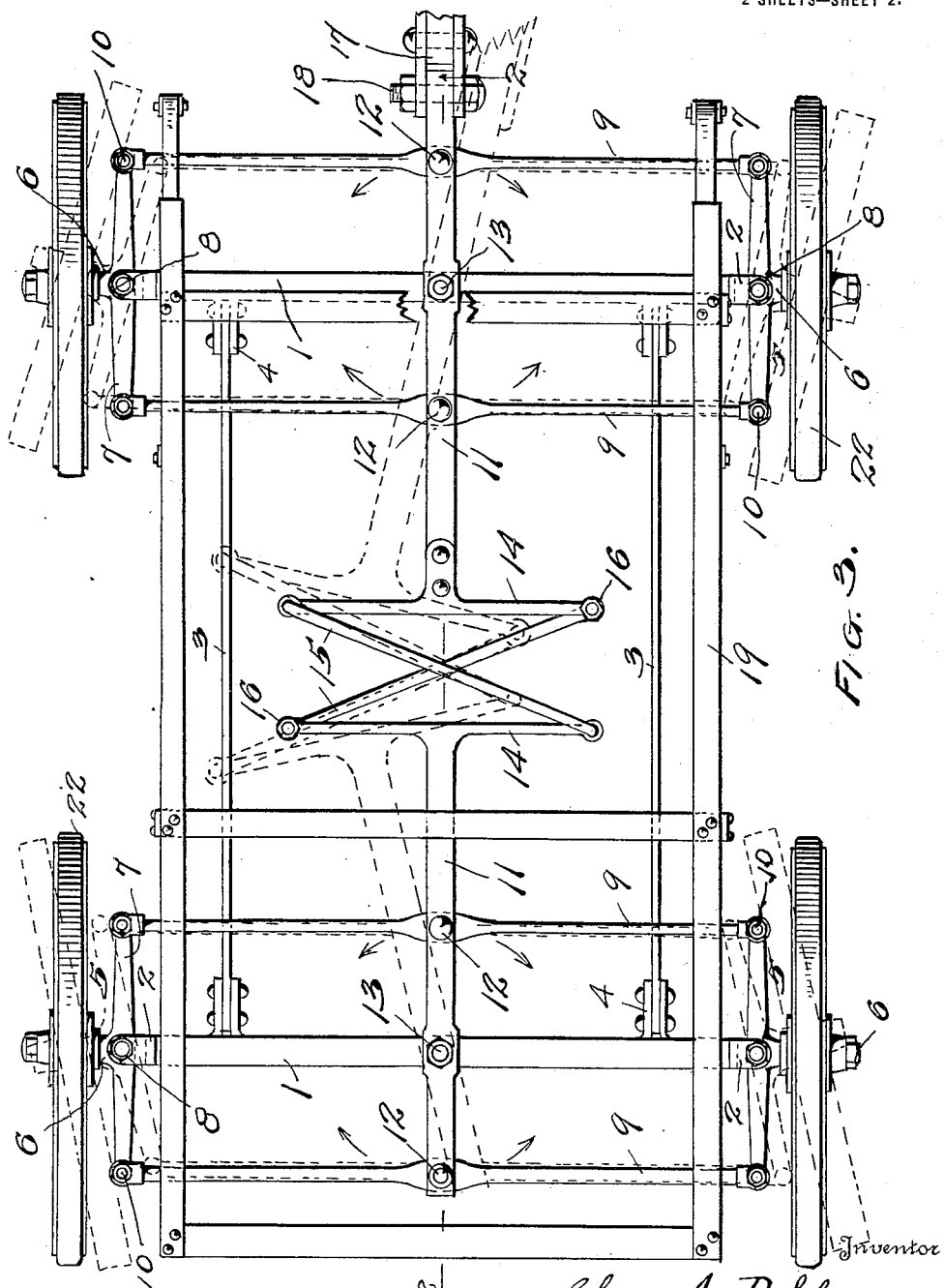

CHARLES A. BEHLEN, OF RICHMOND, VIRGINIA.

TRAILMOBILE.

1,195,960.  Specification of Letters Patent.  Patented Aug. 29, 1916.

Application filed December 28, 1915.  Serial No. 69,027.

*To all whom it may concern:*

Be it known that I, CHARLES A. BEHLEN, a citizen of the United States, residing at Richmond, in the county of Henrico and State of Virginia, have invented certain new and useful Improvements in Trailmobiles, of which the following is a specification.

The invention relates to trailers or trailmobiles which are especially designed and adapted to be attached to an automobile and hauled thereby and carry a load of any character. When such a vehicle is hauled at high speed it is essential that the steering mechanism shall operate quickly, easily, with certainty, and without jerks so as to prevent accidents and insure the perfect trackage behind the power vehicle; and to attain these ends it is desirable that the steering shall be effected through the medium of the drawbar and that all the wheels be positively operated.

My invention consists in the construction of the chassis and the steering mechanism combined with the wheels and drawbar in such a way that both forward and rear wheels will be operated simultaneously and in a positive manner by the horizontal movements of the drawbar.

The accompanying drawings illustrate an example of the embodiment of my invention constructed and the parts combined according to the best mode of procedure I have so far devised for the purpose.

Figure 1 is a side view in elevation of a trailer or trailmobile having my improved steering mechanism. Fig. 2 is a longitudinal section of the chassis and steering mechanism at one side of the center line 2, 2 of Fig. 3. Fig. 3 is a top plan view of the chassis, steering mechanism, and the wagon bed, the dotted lines indicating the positions taken by the parts when the drawbar is moved in a horizontal plane.

Referring to the figures, 1, 1 designate the two axles; 2, the perforated forked ends of the axles; 3, the reaches which are preferably located in a plane below the plane of the axles, the axles being forged and provided with arms 4 to which the ends of the reaches are riveted; 5, the steering knuckles, each comprised of an integral stub axle spindle 6, radial arms 7, 7 with perforations at the ends and a perforated standard, which latter fits between the forked ends of the axles, the same being constructed in a well known way; 8, 8, bolts which are passed through the holes in the forked ends of the axles and the perforations in the standards and secured by nuts, also a well known manner of construction; 9, 9, the rods or bars disposed in pairs each side of an axle, each rod or bar having perforated ends and a perforation at the center; 10, bolts by which the ends of the tie rods or bars are pivoted to the ends of the radial arms 7, 7, as shown; 11, 11, two perforated T-shaped levers with the T ends adjacent each other and spaced a suitable distance apart; 12, bolts by which the T levers are pivoted to the tie rods or bars intermediate the ends of the latter; 13, 13, threaded bolts, in this instance integral with the axles, by which the two levers are pivotally fulcrumed to the axles, nuts on the bolts holding the levers in place; 14, the perforated ends of the T portions of the levers; 15, 15, crossed rods each having the ends bent to positions at right angles to the length of the rod and threaded, the ends being passed through the perforations in the T portions of the levers and secured by nuts 16, as shown, the ends of one rod being extended upwardly through the perforations and the ends of the other rod extended downwardly so the rods will lie in different planes and not engage each other when the T levers are moved about their fulcrums; 17, a drawbar pivotally secured to the end of the front T lever by a bolt 18 so the drawbar may turn in a vertical plane; 19, an angle bar wagon bed of any suitable construction; 20, springs by which the bed is supported on the axles; 21, the body supported by the bed; and 22, the wheels journaled on the spindles.

The body and the bed may be of any type desired, as they do not form any essential part of the invention, which relates to the chassis and the steering mechanism.

The mode of operation is as follows: When the drawbar is moved horizontally the T levers are moved about their fulcrums on the axles and through the medium of the tie rods or bars the steering knuckles and wheels are turned in horizontal planes, as indicated by dotted lines in Fig. 3.

In practice it has been found that by providing each steering knuckle with two arms and each T lever with two tie rods or bars the movements of the parts in steering are very smooth and characterized by the absence of jerks or jars.

It is desirable that two tie rods be used in connection with each lever, as should one become broken or inoperative the other rod or bar will prevent displacement of the parts and a wreckage. However, one rod may be used to connect opposite radial arms when the parts are made of sufficient strength.

What I claim is:

1. The combination of two axles having forked ends; steering knuckles, each having a radial arm, a spindle and a standard, pivoted between the forked ends of the axles; tie rods pivotally connecting the radial arms; and two T-shaped levers each fulcrumed to an axle, pivoted to a tie rod, and the T ends flexibly connected by suitable means so the movements of one T lever will impart motion to the other lever.

2. The combination of two axles having forked ends; steering knuckles, each having two radial arms, a spindle and a standard, pivoted between the forked ends of the axles; tie rods pivotally connecting the radial arms; and two T-shaped levers each fulcrumed to an axle, pivoted to two tie rods, and the T ends flexibly connected by suitable means.

3. The combination of two axles having forked ends; steering knuckles, each having a radial arm, a spindle and a standard, pivoted between the forked ends of the axles; tie rods pivotally connecting the radial arms; and two T-shaped levers each fulcrumed to an axle, pivoted to a tie rod, and the T ends connected by crossed rods or bars.

4. The combination of two axles having forked ends; steering knuckles, each having a radial arm, a spindle and a standard, pivoted between the forked ends of the axles; tie rods pivotally connecting the radial arms; and two T-shaped levers each fulcrumed to an axle, pivoted to a tie rod, and the T ends flexibly connected by suitable means; the axles being united by reaches located in a plane below the tops of the axles, and the T levers fulcrumed in a plane above the axles.

In testimony whereof I affix my signature in the presence of two witnesses.

CHARLES A. BEHLEN.

Witnesses:
Jno. B. Swartwout,
Alex. H. Sands.

Copies of this patent may be obtained for five cents each, by addressing the "Commissioner of Patents, Washington, D. C."